(12) United States Patent
Gomez et al.

(10) Patent No.: US 8,028,431 B2
(45) Date of Patent: *Oct. 4, 2011

(54) PORTABLE METROLOGY DEVICE

(75) Inventors: Daniel Gomez, Fremont, CA (US);
Ryan Steger, Sunnyvale, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/883,760

(22) Filed: Sep. 16, 2010

(65) Prior Publication Data

US 2011/0010957 A1  Jan. 20, 2011

Related U.S. Application Data

(63) Continuation of application No. 11/930,456, filed on Oct. 31, 2007, now Pat. No. 7,797,849.

(51) Int. Cl.
*G01B 5/004* (2006.01)

(52) U.S. Cl. .......................... 33/503; 33/807; 33/558.01

(58) Field of Classification Search .................... 33/503, 33/807, 558.01, 558.04, 558.2, 558.4
See application file for complete search history.

(56) References Cited

U.S. PATENT DOCUMENTS

| | | | | |
|---|---|---|---|---|
| 541,749 A * | 6/1895 | Harris | ............................ | 33/558.4 |
| 658,011 A * | 9/1900 | Hopper | ........................ | 33/558.4 |
| 2,906,179 A * | 9/1959 | Bower | ............................. | 409/80 |
| 4,437,241 A * | 3/1984 | Lemelson | ........................ | 33/818 |
| 5,144,823 A * | 9/1992 | Wood | ............................ | 72/31.05 |
| 5,148,377 A * | 9/1992 | McDonald | ....................... | 702/95 |
| 5,313,713 A * | 5/1994 | Heger et al. | ................. | 33/366.14 |
| 5,337,488 A * | 8/1994 | Lemelson | ......................... | 33/784 |
| 5,488,779 A * | 2/1996 | Schultheis et al. | .......... | 33/366.27 |
| 5,724,264 A * | 3/1998 | Rosenberg et al. | ............ | 702/152 |
| 5,740,881 A * | 4/1998 | Lensak | ............................ | 182/18 |
| 6,026,351 A * | 2/2000 | Takeuchi | ....................... | 702/155 |
| 6,606,539 B2 * | 8/2003 | Raab | ............................. | 700/245 |
| 6,658,755 B2 * | 12/2003 | Arlinsky | .......................... | 33/760 |
| 6,694,636 B1 * | 2/2004 | Maher | ............................. | 33/807 |
| 6,817,108 B2 * | 11/2004 | Eaton | .............................. | 33/503 |
| 6,836,972 B2 * | 1/2005 | Drahos et al. | ............... | 33/366.11 |
| 6,890,312 B1 * | 5/2005 | Priester et al. | ................. | 600/595 |
| 6,904,691 B2 * | 6/2005 | Raab et al. | ....................... | 33/503 |
| 6,931,745 B2 * | 8/2005 | Granger | ........................... | 33/503 |
| 6,981,333 B2 * | 1/2006 | Busch | ............................... | 33/645 |
| 7,051,447 B2 * | 5/2006 | Kikuchi et al. | ................. | 33/503 |
| 7,395,606 B2 * | 7/2008 | Crampton | ......................... | 33/503 |
| 7,797,849 B2 * | 9/2010 | Gomez et al. | .................... | 33/503 |
| 2001/0020199 A1 * | 9/2001 | Bacchi et al. | ................. | 700/245 |
| 2002/0088135 A1 * | 7/2002 | Arlinsky | .......................... | 33/760 |
| 2003/0146898 A1 * | 8/2003 | Kawasaki et al. | ............. | 345/156 |

* cited by examiner

*Primary Examiner* — Christopher Fulton
(74) *Attorney, Agent, or Firm* — Kilpatrick Townsend & Stockton LLP

(57) ABSTRACT

Methods and systems for a portable metrology device are described. One embodiment of the present invention is an apparatus including a first link, a first probe coupled with the first link by a first coupling operable to move in a first degree of freedom, a second probe coupled with the first link by a second coupling operable to move in a second degree of freedom, a first sensor operable to output a first sensor signal associated with a motion of the first coupling, and a second sensor operable to output a second sensor signal associated with a motion of the second coupling. The embodiment also includes a processor in communication with the first and second sensors and operable to: receive the first sensor signal and the second sensor signal, and determine a distance between the first probe and the second probe based at least in part on the first sensor signal and the second sensor signal.

13 Claims, 5 Drawing Sheets

PORTABLE METROLOGY DEVICE

CROSS REFERENCE TO RELATED APPLICATIONS

This application is a Continuation of U.S. patent application Ser. No. 11/930,456, filed Oct. 31, 2007, and issued as U.S. Pat. No. 7,797,849 on Sep. 21, 2010, entitled Portable Metrology Device, the entirety of which is hereby incorporated by reference.

FIELD OF THE INVENTION

The present invention relates generally to spatial measuring devices. The invention relates more particularly to a portable metrology device.

BACKGROUND

High accuracy metrology has been utilized in the manufacturing context for a number of years. For example, many manufacturers have traditionally utilized a coordinate measuring machine ("CMM") or calipers to provide measurements for determining adherence to manufacturing tolerances, such as for the manufacture of an automobile engine. While CMM's are very accurate, they are also expensive, large, and their configuration is dependent on the specific application for which they are designed.

While calipers are relatively inexpensive, they are also inflexible. Thus, they are not able to measure a broad variety of shapes and sizes.

In about the past decade or so, articulated arm-type CMM devices have begun to replace the gantry-type CMM. An articulated arm-type device utilizes a mechanical structure that resembles a robot arm. While these devices are not as accurate as a CMM and are still expensive, they tend to be less expensive than CMM's. Such devices are utilized for computer animation, three-dimensional shape digitizing, metrology, and in some medical applications. Such devices are typically grounded to a fixed reference surface. Thus, in order to use a device in a different place, the device must be detached from the surface and relocated, which limits the device's flexibility.

SUMMARY

Embodiments of the present invention provide methods and systems for a portable metrology device. One embodiment of the present invention is an apparatus comprising a first link, a first probe coupled with the first link by a first coupling operable to move in a first degree of freedom, a second probe coupled with the first link by a second coupling operable to move in a second degree of freedom, a first sensor operable to output a first sensor signal associated with a motion of the first coupling, and a second sensor operable to output a second sensor signal associated with a motion of the second coupling. The embodiment also comprises a processor in communication with the first and second sensors and operable to: receive the first sensor signal and the second sensor signal, and determine a distance between the first probe and the second probe based at least in part on the first sensor signal and the second sensor signal.

This embodiment is mentioned not to limit or define the invention, but to provide an example of an embodiment of the invention to aid understanding thereof. Embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Figure 1:
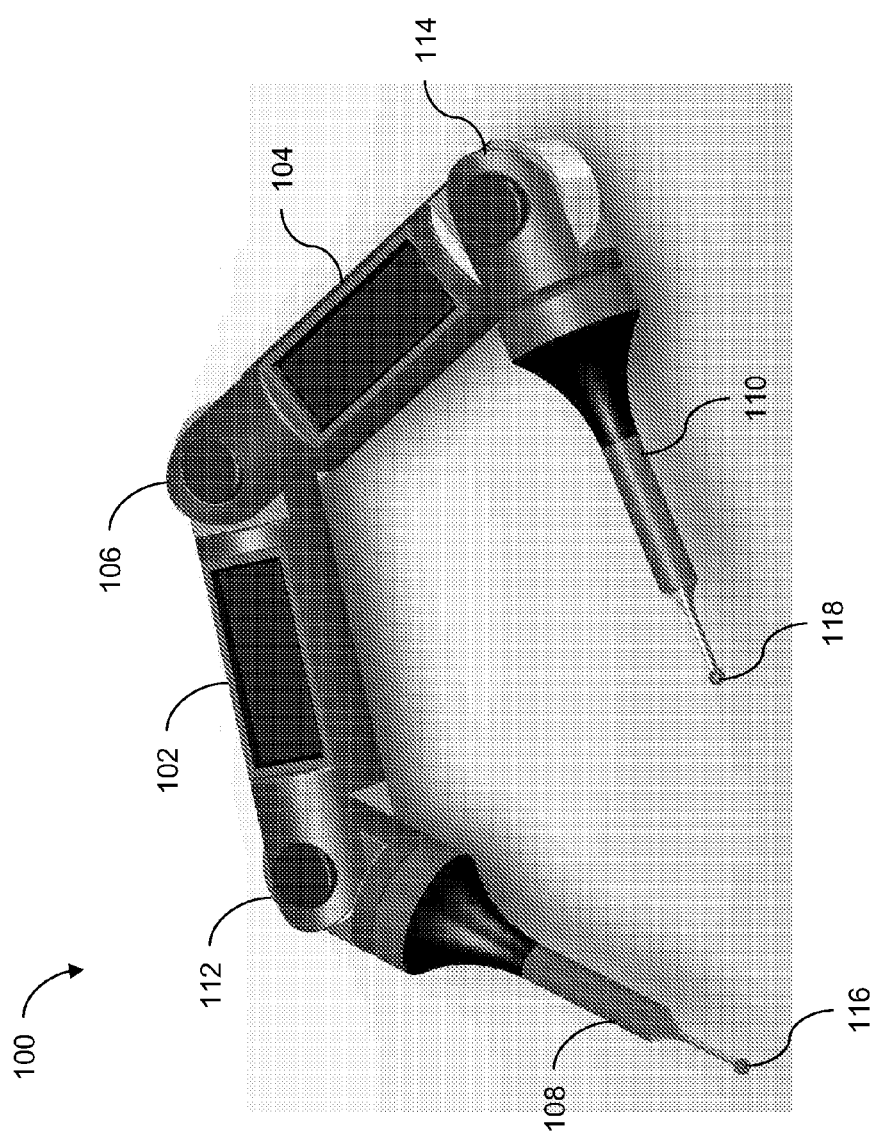
FIG. 1 is a perspective illustration of a two-link portable metrology device according to one embodiment of the present invention.

Embodiments of the present invention provide methods and systems for a portable metrology device.

Illustrative Portable Metrology Device

In one illustrative embodiment, a portable metrology device comprises a plurality of articulated rigid links attached in series and terminated at both ends with a thin stylus or measurement probe. The probe may comprise, for example, a calibrated metrology ruby tip, a hard pointed tip, a tip shaped for a specific measurement task, such as groove measurement, or some other type of probe. Such a device resembles a snake.

The couplings between each probe and each link are equipped with a sensor, such as a high resolution position encoder. The sensor is able to measure the relative position of the links on either side of the coupling and provide a sensor signal containing that information to a processor. In one such device, the couplings comprise a high quality angular (revolute joint) and/or linear (prismatic joint) bearing.

The illustrative embodiment is portable and relatively small so that it can be used in small areas. Such a device is capable of taking absolute and relative measurements. When the device is hand held it can measure a point-to-point distance between the two probe tips on opposite ends of the device. The multiple degrees of freedom allow it to "wrap" around objects and measure locations that cannot be reached with a Cartesian Coordinate Measuring Machine ("CMM") or standard caliper.

In one embodiment, one of the probes can be grounded to a fixed base. This allows the device to measure absolute position with respect to the fixed base. In this configuration the device resembles an articulated arm-type CMM. The base can provide a kinematic mount for the base-end stylus of the snake to ensure the position of the stylus is accurately known. In addition, the base can provide charging to batteries inside the snake and can serve as a communication link to a host computer.

The illustrative embodiment comprises a processor. The processor can determine a linear distance between the two probes and display the result in an embedded display. The device may be optionally programmed to perform specific measurement tasks (e.g. measuring a hole internal diameter, measuring a bolt hole pattern, or capturing a surface profile). The display can optionally present information to the user to guide them through the measurement task. The display may comprise one or more elements, including a visual screen for presenting textual and/or graphical information and indicator lights for indicating status and measurement information. The illustrative embodiment may also comprise audio and haptic feedback elements for providing information related to the measurement tasks and results and the device status. The device may also be able to communicate (wired and/or wireless) to a host computer for more advanced measurement applications.

This illustrative example is given to introduce the reader to the general subject matter discussed herein. The invention is not limited to this example. The following sections describe various additional embodiments and examples of methods and systems for animating displayed representations of data items.

Two-Link Portable Metrology Device

FIG. 1 is a perspective illustration of a two-link portable metrology device according to one embodiment of the present invention. The metrology device 100 shown in the embodiment of FIG. 1 comprises a first link 102 and a second link 104. The links 102, 104 may comprise any suitable material such as a metal, carbon composite, or plastic.

Figure 5:
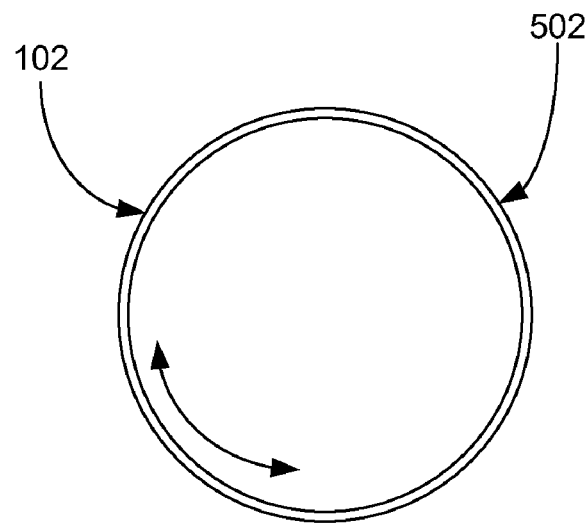
FIG. 5 is a cross-section illustration of a link comprising a revolute joint according to one embodiment of the present invention.
Figure 6:
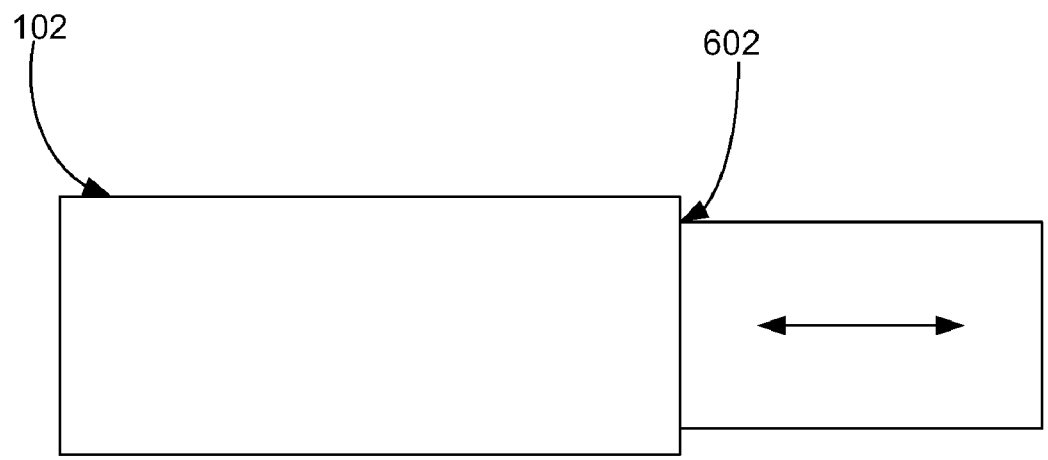
FIG. 6 is an illustration of a link comprising a prismatic joint according to one embodiment of the present invention.

The links 102, 104 shown are fixed links, but some embodiments comprise one or more expandable (e.g., via a prismatic joint along the axis of the link FIG. 6, 602) or rotatable (e.g., twisting on an axis via a revolute joint FIG. 5, 502) links. In one such embodiment, the expandable link comprises a sensor for determining the length of the link or of the expansion of the link so that the length or expansion can be taken into account in determining the appropriate measurement.

The links 102, 104 are joined via a coupling 106. The coupling 106 is moveable in one degree of freedom. The degree of freedom shown is a pivoting degree of freedom, which is parallel with the links 102, 104. In other embodiments, the links may be joined in a twisting degree of freedom. In yet other embodiments, each coupling may be capable of moving in two or more degrees of freedom. In the embodiment shown, the coupling 106 is an integral part of the link. In other words, no separate coupling is shown. In other embodiments, the coupling may comprise a completely separate element, such as an element that snaps or otherwise affixes to a blunt end of a link, or may be a combination of a coupling integrated with the link and one or more separate elements that provide the necessary degrees of freedom.

A sensor (not shown) is embedded in each coupling. The sensor is able to sense the movement of the coupling in one or more degrees of freedom and generate one or more sensor signals reflecting the movement. In one embodiment, the sensor comprises an optical encoder that provides information about the angular position between the two links connected by the joint. In other embodiments, other suitable types of sensors may be utilized.

In some embodiments, a kinesthetic or vibrotactile actuator provides haptic feedback to the metrology device. Such an actuator may be used to resist the movement of a coupling or a link or made provide some indication of the state of the device. For instance, in one embodiment, the metrology device produces a low frequency vibration when the battery is running low. In another embodiment, the user is able to set an upper and lower limit for a distance measurement. When the distance between the two probes falls outside of this distance, the device vibrates at a low frequency that increases as the distance measurement approaches one of the limits. When the distance measurement is at or between the limits, a higher frequency vibration is output to provide an indication to the user that the limit has been met. In another embodiment, the kinesthetic or vibrotactile feedback can be used to indicate to a user that the measurement device is oriented in a configuration that is unsuitable for measurement, such as at a mechanical singularity of the links in the device.

The embodiment shown also comprises two probes 108, 110. Each probe 108, 110 is coupled to a link 102, 104 by a coupling 112, 114. The couplings 112, 114 are similar to the coupling 106 that joins the two links 102, 104. In other embodiments, various types of couplings may be mixed and matched to achieve the desired types of articulation for the portable metrology device.

In the embodiment shown in FIG. 1, coupled to the end of each probe 108, 110 is a tip 116, 118. The tips 116, 118 shown are metrology ruby tips. In other embodiments, other types of tips may be utilized. For example, in some embodiments, a tip may comprise a hard pointed tip, a tip shaped for a specific measurement tasks such as groove measurement, a marker, such as a marker for use in marking a patient's body prior to surgery, or some other type of tip. In other embodiments, the tip may comprise a laser, a drill, a needle, a cutter, a camera, a light source, a clamp or surgical tool, an eddy current sensor, an acoustic or Doppler sensor, or a magnet. While the tips 116, 118 shown in FIG. 1 are separate elements that coupled to the probes 108, 110, in other embodiments, the tips 116, 118 may be an integral part of the probe 108, 110.

The links, couplings, probes, and tips shown in FIG. 1 are all linked together to form the metrology device. Such elements may be coupled such that the individual elements can be decoupled from one another. In that way, additional elements (i.e., links, couplings, probes, and tips) can be substituted or added to the device, allowing the device to measure different shapes and sizes of components. Also, such couplings allow the device to be stored compactly.

For instance, one embodiment of the present invention comprises a plurality of links, a plurality of couplings, a plurality of probes, and a plurality of tips. The elements are stored in a case, and when a user wishes to use a portable metrology device, the user selects the individual elements and couples them together prior to use. Such an embodiment allows a user to tailor the size and capabilities of the device to the particular application to which the user plans to employ the device.

Fixed Base Portable Metrology Device

Figure 2:
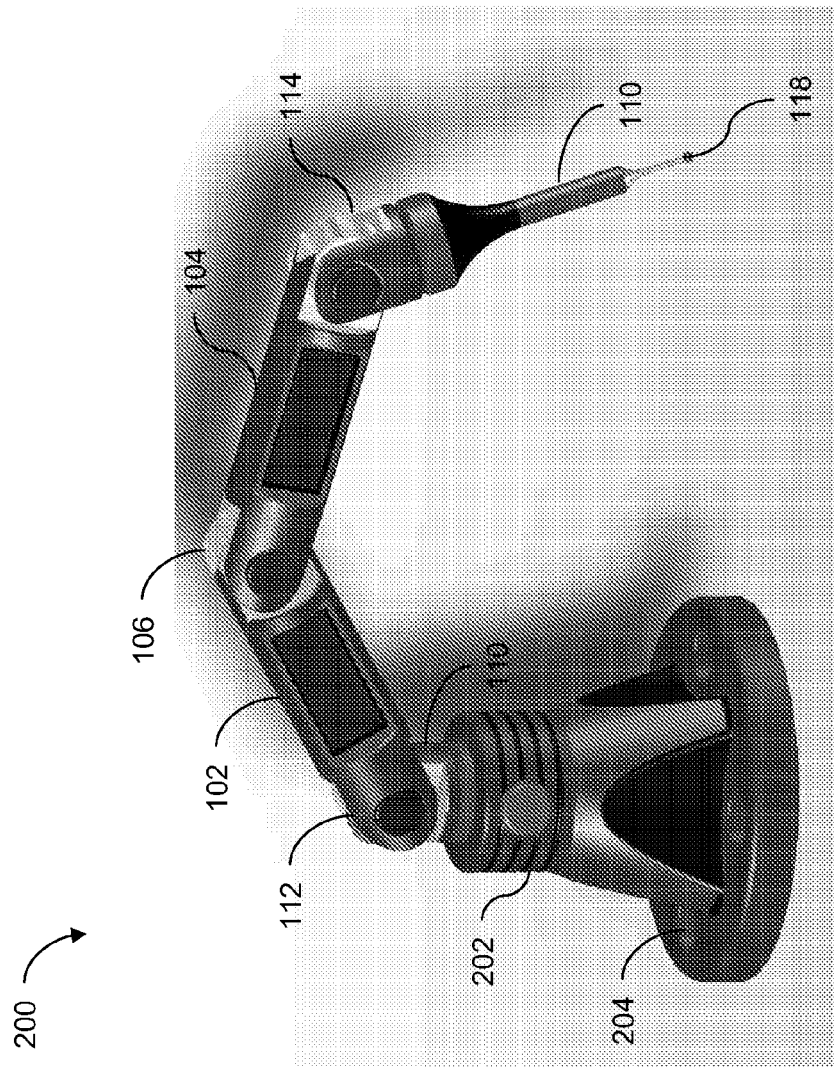
FIG. 2 is a perspective illustration of the two-link portable metrology device in FIG. 1 mounted in a base according to one embodiment of the present invention.

FIG. 2 is a perspective illustration of the two-link portable metrology device in FIG. 1 mounted in a base according to one embodiment of the present invention. Like the metrology device 200 shown in FIG. 1, the metrology device 200 shown in FIG. 2 comprises two links 102, 104, three couplings 106, 112, 114, and two probes 108, 110. The embodiment shown also comprises a tip 118.

In the device shown in FIG. 2, one of the probes 110 is inserted into a fixed base 202. In this configuration the device resembles an articulated arm-type CMM. The base 202 can provide a kinematic mount for one probe of the metrology device to ensure that the position of the tip 118 is accurately known. The metrology device 200 may simply be pushed into the base 202 and held there by friction. For example, in one embodiment, the base 202 comprises a rubber insert to hold the metrology device. In another embodiment, the base 202 comprises a locking mechanism, such as a locking collar, to hold the metrology device 200 in the base 202.

In addition, the base 202 can provide charging to a power source, such as one or more batteries, inside the metrology device 200. The base 202 may also comprise communication facilities for communicating with a display or computer and/or downloading a history of measurement data. Such communication may be in the form of wireless or wired communication.

Single-Link Portable Metrology Device

Figure 3:
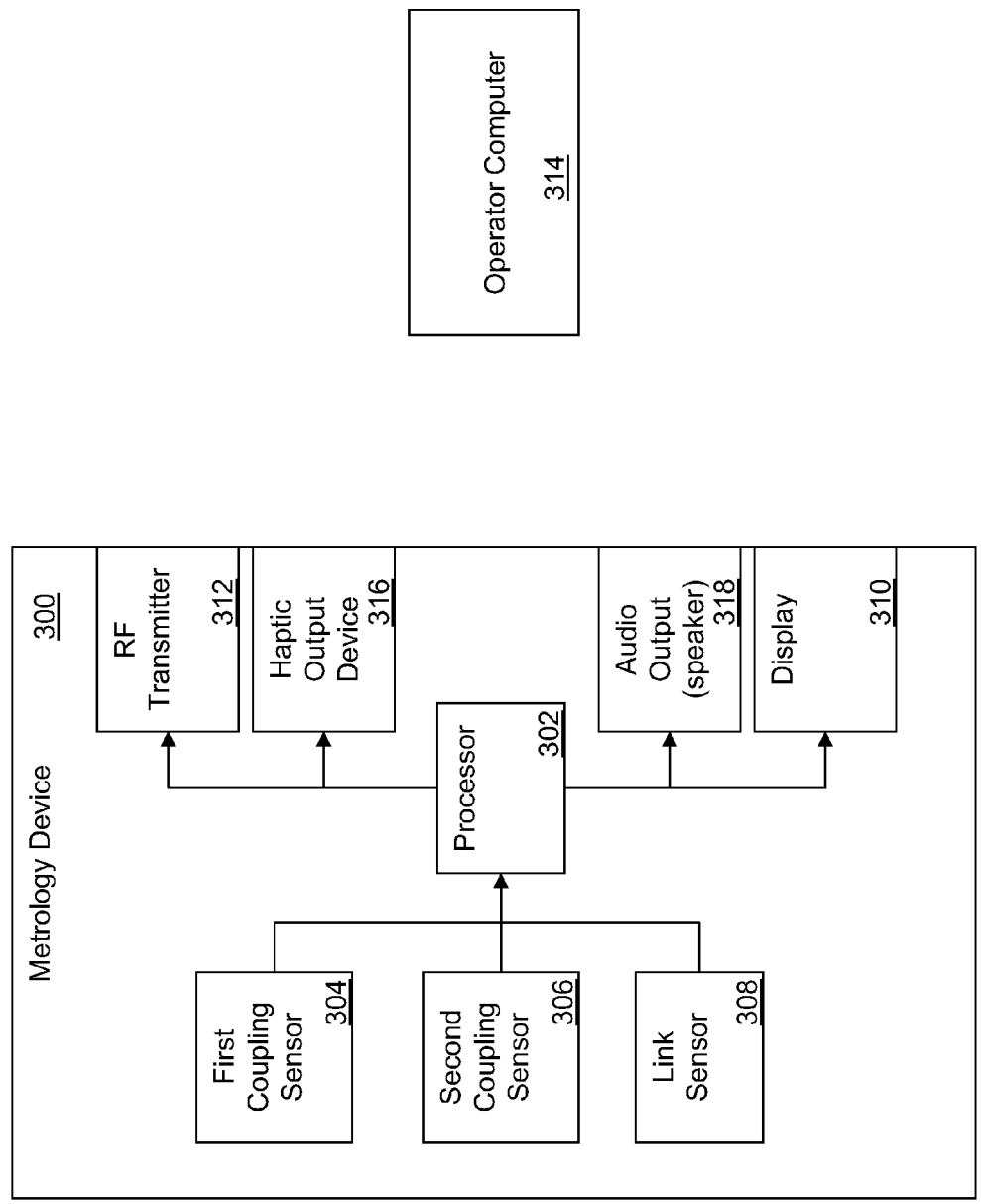
FIG. 3 is a block diagram of the components of a metrology device in one embodiment of the present invention.

FIG. 3 is a block diagram of the components of a metrology device in one embodiment of the present invention. The metrology device 300 shown in FIG. 3 comprises a processor 302. The processor 302 executes one or more software applications in order to take measurements, display information, transmit information, and perform the other functions of the metrology device.

As is known to one of skill in the art, such applications may be resident in any suitable computer-readable medium and execute on any suitable processor. Such processors may comprise a microprocessor, an ASIC, a state machine, or other processor, and can be any of a number of computer processors, such as processors from Intel Corporation of Santa Clara, Calif. and Motorola Corporation of Schaumburg, Ill. The computer-readable media stores instructions that, when executed by the processor, cause the processor to perform the steps described herein.

Embodiments of computer-readable media comprise, but are not limited to, an electronic, optical, magnetic, or other storage device or transmission or other device that comprises some type of storage and that is capable of providing a processor with computer-readable instructions. Other examples of suitable media comprise, but are not limited to, a floppy disk, CD-ROM, DVD, magnetic disk, memory chip, ROM, RAM, RPOM, EPROM, EEPROM, an ASIC, a configured processor, all optical media, all magnetic tape or other magnetic media, or any other medium from which a computer processor can read instructions. Also, various other forms of computer-readable media embedded in devices that may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

The metrology device 300 shown in FIG. 3 also comprises a plurality of sensors in communication with the processor 302. The metrology device 300 comprises a first coupling sensor 304. In an embodiment of the present invention that comprises a coupling moveable in a single revolute degree of freedom, the coupling sensor 304 generates a signal that comprises the angle of the coupling. In other embodiments in which the coupling is moveable in more than one degree of freedom, the first coupling sensor 304 generates a signal including a plurality of angles. The processor 302 receives the signal and utilizes it to determine the position of each end of the metrology device 300.

The embodiment shown also comprises a second coupling sensor 306. The second coupling sensor 306 may be the same type of sensor as the first coupling sensor 304 or may be of a different type depending on the configuration of the metrology device 300.

The metrology device 300 shown in FIG. 3 also comprises a link sensor 308. The link sensor 308 shown may provide a sensor signal indicating the length or degree or rotation of a link section. For example, in one embodiment, a link is able to be expanded from a first minimum length to a second maximum length via an internal prismatic joint. In such an embodiment, the sensor signal from the link sensor provides an indication of the length of the link section when the signal is generated. In an embodiment having a link that is able to twist around the long axis of the link, the link sensor provides a sensor signal indicative of the degree of rotation of the ends of the link with respect to one another.

The embodiment shown in FIG. 3 also comprises a display 310. The display 310 may be configured to show a measurement between the ends or tips of two probes attached to the end of a link or coupling. The display 310 may show other information as well. In one embodiment, the metrology device 300 also includes buttons that can be used in conjunction with the display 310 to configure the metrology device 300 or perform other functions that may require input. In another embodiment, the display 310 comprises a touch screen. The user is able to use the touch screen to modify the configuration of the device 300 or perform other functions that may require input. While the embodiment shown in FIG. 3 comprises a display, various other embodiments of the present invention do not comprise a display.

The metrology device 300 also comprises an RF (Radio Frequency) transmitter 312. The RF transmitter 312 transmits a signal to a computer, such as operator computer 314, or other device so that the other device can determine or use the length measurement from the metrology device. For instance, the operator computer 314 may receive a measurement signal from the RF transmitter 312 and use that signal to track a series of measurements from the metrology device. In another embodiment, the metrology device 300 doe not comprise a display, and operator computer 314 comprises a personal digital assistant or external computer and computer display, which acts as the display for the metrology device 300. While the embodiment shown in FIG. 3 comprises an RF transmitter 312, other types of interfaces, such as parallel, serial, infrared, Bluetooth, and others may be utilized to transfer signals from the metrology device 300 to external devices. While the embodiment shown in FIG. 3 comprises an RF transmitter, various other embodiments of the present invention do not comprise an RF transmitter or any other form of wired or wireless communication.

The embodiment shown in FIG. 3 also comprises a haptic output device 316. The haptic output device 316 includes an actuator that responds to an actuator signal and provides haptic feedback to a user of the device 300. The actuator may comprise, for example, a piezoelectric actuator, a solenoid, a pager motor, or other types of active or passive actuators. While the embodiment shown in FIG. 3 comprises one haptic output device 316, in other embodiments, the metrology device 300 may comprise a plurality of haptic output devices or no haptic output devices.

The embodiment shown in FIG. 3 also comprises an audio output 318. In the embodiment shown, the audio output 318 comprises a loudspeaker for outputting sound. Such an audio output 318 may provide the user with status, such as low battery, results of an action, such as a final measurement, or with other information of use to a user. An audio output 318 may also be used to provide the user with step-by-step instructions for completing a task, such as performing a particular type of measurement.

Method of Measuring

Figure 4:
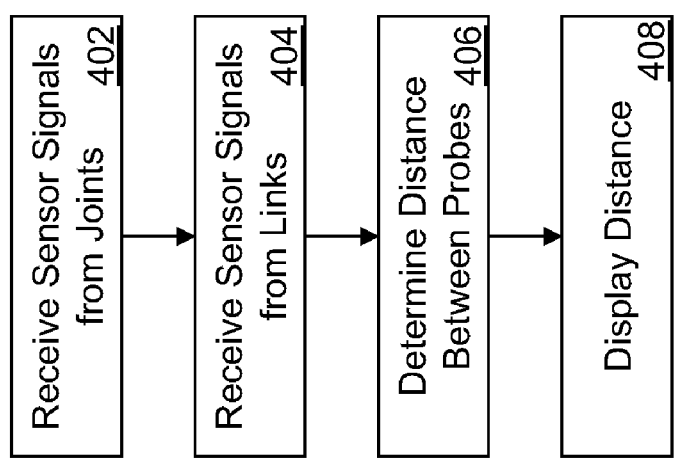
FIG. 4 is a flowchart illustrating a method of measuring a distance with one embodiment of the present invention.

FIG. 4 is a flowchart illustrating a method of measuring a distance with one embodiment of the present invention. In the embodiment shown a processor receives signals from the joints or couplings of the device 402. These signals may comprise one or more angle measurements corresponding to the degree of rotation of a coupling or joint in one or more degrees of freedom. For example, if a coupling or joint is able to rotate in one degree of freedom, the joint sensor may generate a sensor signal comprising a measurement in degrees from a starting position.

The processor also receives one or more sensor signals from the link or links in the metrology device 404. For instance, in an embodiment in which the link is expandable, the processor may receive measure corresponding to the over length of the link or to the amount of extension of the link. If the link is able to rotate, the link sensor may generate a signal corresponding to the rotation of the link from a starting position. For instance, the starting position may be when the ends of the link are aligned. In some embodiments, the link does not include a sensor or may include a plurality of sensors. In an embodiment of the device in which multiple different length links can be selected and connected together to construct a device suited for a specific measurement task, the links can report to the processor their geometric parameters via an electronic identification code stored on or derived from the link.

The processor then determines the distance between the probes at the two ends of the metrology device 406. In making the determination, the processor utilizes all of the joint and link sensor signals. The method for calculating the distance between ends of an articulated arm are well known to those of skill in the art and thus will not be described herein.

The processor then causes the distance between the two ends to be displayed on a display 408. The display may be integral to the metrology device or may be contained within a remote device. In such an embodiment, the metrology device transmits the distance to the portable device, which then displays the measurement.

Applications of a Portable Metrology Device

Embodiments of the present invention may be utilized for a variety of applications. These applications include, for example, metrology, digitization, medical, manufacturing, and cartographic applications. For example, a metrology device according to the present invention may be utilized to measure the inside or outside diameter of a component. Such measurements may be extremely difficult to take with current metrology devices or require special instruments designed to perform only the single specific measurement task.

Metrology devices according to embodiments of the present invention may also be used for reverse engineering, allowing an engineer or technician to take absolute and relative measurements of a device. Such a device could replace a standard caliber and provide the ability to measure places where a standard linear caliper would be unable to do so.

Embodiments of the present invention may also be utilized in a medical environment. For example, such embodiments may be used to take external measurements of the human body, such as a patient's biometric measurements. In the configuration utilizing a fixed base, embodiments of the present invention may be used to guide ultrasonic probes or even position tools like cutters and drills.

In one embodiment, one of tips or probes is replaced with a marker or pen. Using such an embodiment, a surgeon, such as a plastic surgeon, is able to make ink marks on a patient's skin, bone, or other body part in preparation for surgery. Such devices may be able to eliminate the setup requirements of complex articulated arm measurement devices currently in use. In another embodiment, a camera may be utilized at one end of the metrology device for performing endoscopic surgery.

Embodiments of the present invention may also be utilized in the manufacturing context. For example, an embodiment of the present invention may be utilized to measure components to be used in building a finished product. In a configuration of a metrology device that includes a fixed base; such embodiments may be utilized for guided tracing and tool placement by means of path planning and control software.

General

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

That which is claimed:

1. An apparatus comprising:
   a first link comprising an expandable link and further comprises a link length sensor operable to sense a length of the first link and output a length signal;
   a first probe coupled with the first link by a first coupling operable to move in a first degree of freedom;
   a second probe coupled with the first link by a second coupling operable to move in a second degree of freedom;
   a first sensor operable to output a first sensor signal associated with a motion of the first coupling;
   a second sensor operable to output a second sensor signal associated with a motion of the second coupling, and
   a processor in communication with the first and second sensors and the link length sensor and operable to:
     receive the first sensor signal, the second sensor signal, and the length signal, and
     determine a distance between the first probe and the second probe based at least in part on the first sensor signal and the second sensor signal.

2. The apparatus of claim 1, further comprising:
   a second link coupled between the first link and the first coupling with a third coupling operable to move in a third degree of freedom;
   a third sensor operable to output a third sensor signal associated with a motion of the first coupling; and
   wherein the processor is further operable to receive the third sensor signal and determine a distance between the first probe and the second probe based at least in part on the first sensor signal, the second sensor signal, and the third sensor signal.

3. The apparatus of claim 2, wherein the first coupling is further operable to move in a fourth degree of freedom.

4. The apparatus of claim 3, wherein the first degree of freedom comprises a twisting degree of freedom and the fourth degree of freedom comprises a pivoting revolute degree of freedom.

5. The apparatus of claim 1, further comprising a display coupled to the processor and operable to:
   receive the distance; and
   display the distance.

6. The apparatus of claim 1, wherein the first degree of freedom comprises a twisting degree of freedom.

7. The apparatus of claim 1, wherein the first degree of freedom comprises a pivoting revolute degree of freedom.

8. The apparatus of claim 1, wherein communication between the first sensor and the processor is wireless.

9. The apparatus of claim 1, wherein the processor comprises a first processor and further comprising a second processor in communication with the first processor and operable to receive the distance from the first processor.

10. The apparatus of claim 1, wherein the first probe comprises one of a marker, a laser, a drill, a needle, a cutter, a camera, a light source, a clamp or surgical tool, an eddy current sensor, an acoustic or Doppler sensor, or a magnet.

11. The apparatus of claim 1, wherein the first probe is removably coupled to the first link.

12. The apparatus of claim 1, further comprising an audio output.

13. The apparatus of claim 1, further comprising an actuator for providing haptic feedback.

\* \* \* \* \*

UNITED STATES PATENT AND TRADEMARK OFFICE
CERTIFICATE OF CORRECTION

| | | |
|---|---|---|
| PATENT NO. | : 8,028,431 B2 | Page 1 of 1 |
| APPLICATION NO. | : 12/883760 | |
| DATED | : October 4, 2011 | |
| INVENTOR(S) | : Daniel Gomez et al. | |

It is certified that error appears in the above-identified patent and that said Letters Patent is hereby corrected as shown below:

Column 6, Line 32, After "the metrology device 300" please delete "doe", please insert -- does --.

Signed and Sealed this
Third Day of April, 2012

David J. Kappos
*Director of the United States Patent and Trademark Office*